(12) United States Patent
Nishioka (10) Patent No.: US 7,821,688 B2
(45) Date of Patent: Oct. 26, 2010

(54) IMAGE PROCESSING DEVICE AND IMAGE PROCESSING METHOD

(75) Inventor: Naoki Nishioka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 218 days.

(21) Appl. No.: 12/108,365

(22) Filed: Apr. 23, 2008

(65) Prior Publication Data

US 2008/0266613 A1  Oct. 30, 2008

(30) Foreign Application Priority Data

Apr. 24, 2007  (JP) .............................. 2007-113957

(51) Int. Cl.
G03F 3/08  (2006.01)
H04N 1/46  (2006.01)
H04N 1/60  (2006.01)
G06K 9/00  (2006.01)

(52) U.S. Cl. ...................... 358/518; 358/505; 358/515; 358/1.9; 382/162; 382/163; 382/167; 382/283

(58) Field of Classification Search ................. 358/518, 358/449, 473, 488, 500, 501, 505, 522, 523, 358/530, 401, 406, 426.01, 515, 524, 1.9; 382/162, 167, 166, 232, 163, 172, 165, 168, 382/169, 170, 276, 283
See application file for complete search history.

(56) References Cited

U.S. PATENT DOCUMENTS

| | | | | |
|---|---|---|---|---|
| 5,182,638 A | * | 1/1993 | Tsuboi et al. | ............... 358/518 |
| 6,757,426 B2 | * | 6/2004 | Link et al. | ................... 382/163 |
| 6,807,296 B2 | | 10/2004 | Mishima | |
| 7,075,681 B1 | * | 7/2006 | Brothers | ................ 358/426.01 |
| 7,379,204 B2 | | 5/2008 | Fukao | |
| 2002/0126302 A1 | | 9/2002 | Fukao | |
| 2002/0164071 A1 | | 11/2002 | Mishima | |

FOREIGN PATENT DOCUMENTS

| | | |
|---|---|---|
| JP | 2002223366 A | 8/2002 |
| JP | 2002271812 A | 9/2002 |
| JP | 2002-305665 | 10/2002 |
| JP | 2004-007370 | 1/2004 |
| JP | 2006345137 A | 12/2006 |

OTHER PUBLICATIONS

Japanese language office action and its English language translation for corresponding Japanese application 2007113957 lists the references above.

* cited by examiner

Primary Examiner—Charlotte M Baker
(74) Attorney, Agent, or Firm—Hogan Lovells US LLP (57) ABSTRACT

An original document is scanned, an arbitrary color area in a chromaticity plane is extracted with respect to the scanned original document, coordinate conversion is performed on the extracted color area in the chromaticity plane, and a mask area is determined to be masked, in accordance with the converted color area on which the coordinate conversion has been performed.

20 Claims, 6 Drawing Sheets

IMAGE PROCESSING DEVICE AND IMAGE PROCESSING METHOD

CROSS-REFERENCE TO RELATED APPLICATIONS

This application claims priority under 35 U.S.C. 119 to Japanese Patent Application No. 2007-113957, filed on Apr. 24, 2007, which application is hereby incorporated by reference in its entirety.

BACKGROUND OF THE INVENTION

1. Field of the Invention

The present invention relates to determining whether a scanned original document is in color or monochrome. More specifically, the present invention relates to an image processing device and method that can handle a background color as monochrome even when the background color is chromatic, by extracting and masking the background color of the scanned original document.

2. Description of the Related Art

In order to determine whether a scanned original document is in color or monochrome, the conventional art suggests determining whether image data is in color or monochrome by dividing a predetermined area in a chromaticity plane (an a*b* plane of the L*a*b* uniform color space) into 25 rectangular areas, and determining whether or not a pixel exists in each of the areas.

In the conventional art, each of the 25 areas is disposed in the vicinity of the origin of the chromaticity plane. Therefore, a background color area that is disposed outside the 25 areas cannot be detected. Thus, in the conventional art, it may be difficult to detect a chromatic background color (chromaticity and hue). In other words, in a color original document, the background color area may be disposed away from the origin of the chromaticity plane, and it may be difficult to extract and mask the background color. Moreover, it is desirable to mask the background color by using a simple arithmetic circuit or arithmetic processing.

SUMMARY OF THE INVENTION

The present invention overcomes these problems and provides a technique for reliably masking a background color area by using a simple arithmetic circuit or arithmetic processing.

A first aspect of the present invention provides a scanning unit that scans an original document; a color extracting unit that extracts an arbitrary color area in a chromaticity plane with respect to the original document scanned by the scanning unit; a coordinate converting unit that performs, in the chromaticity plane, coordinate conversion on the color area extracted by the color extracting unit; and a masking unit that determines a mask area to mask, in accordance with the converted color area on which the coordinate converting unit has performed the coordinate conversion.

According to a second aspect of the present invention, the coordinate converting unit rotates a central coordinate of the color area extracted by the color extracting unit, around the origin of the chromaticity plane onto a coordinate axis.

According to a third aspect of the present invention, the masking unit determines, as a mask area to mask, an area including a rectangular area which is defined to be more than or equal to zero and less than or equal to a maximum value of the converted color area on one coordinate axis, and to be more than or equal to a minimum value and less than or equal to a maximum value of the converted color area on another coordinate axis.

According to a fourth aspect of the present invention, a background-color detecting unit is further provided to detect a background color of the original document scanned by the scanning unit, and the color extracting unit extracts the color area of the background color detected by the background-color detecting unit.

According to the first aspect of the present invention, since the arbitrary color area of the original document in the chromaticity plane is extracted, and the mask area is determined in accordance with the extracted color area, any color area is reliably masked. Since the color area is masked after the coordinate conversion is performed in the chromaticity plane, the masking is performed by using a simple arithmetic circuit. The "chromaticity plane" refers to a plane that has an achromatic axis as the origin and two parameters, which represent colors, as coordinate axes. For example, the plane may refer to a CbCr color difference plane in a YCbCr calorimetric system or an a*b* chromaticity plane in an L*a*b* calorimetric system, but is not limited to the CbCr color difference plane and the a*b* chromaticity plane. The "mask" refers to an area in color space that is determined as achromatic even when the color space is chromatic.

According to the second aspect of the present invention, since the coordinate converting unit rotates the central coordinate of the color area extracted by the color extracting unit, around the origin of the chromaticity plane, and moves the central coordinate onto one coordinate axis, the color area is masked by using simple calculation compared with a case in which the mask area is determined without having the coordinate conversion performed.

According to the third aspect of the present invention, since the masking unit determines, as the mask area to mask, the area including the rectangular area which is defined to be more than or equal to zero and less than or equal to the maximum value of the converted color area on the one coordinate axis, and to be more than or equal to the minimum value and less than or equal to the maximum value of the converted color area on the other coordinate axis, the background color area is masked by using simpler calculation.

According to the fourth aspect of the present invention, since the background-color detecting unit is further provided for detecting the background color of the original document, and the color extracting unit extracts the background color detected by the background-color detecting unit, the background color area is reliably masked by using the simple arithmetic circuit.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

<First Embodiment>

With reference to the drawings, a copier is described as an example of an image processing device according to a first embodiment of the present invention.

<Configuration>

Figure 1:
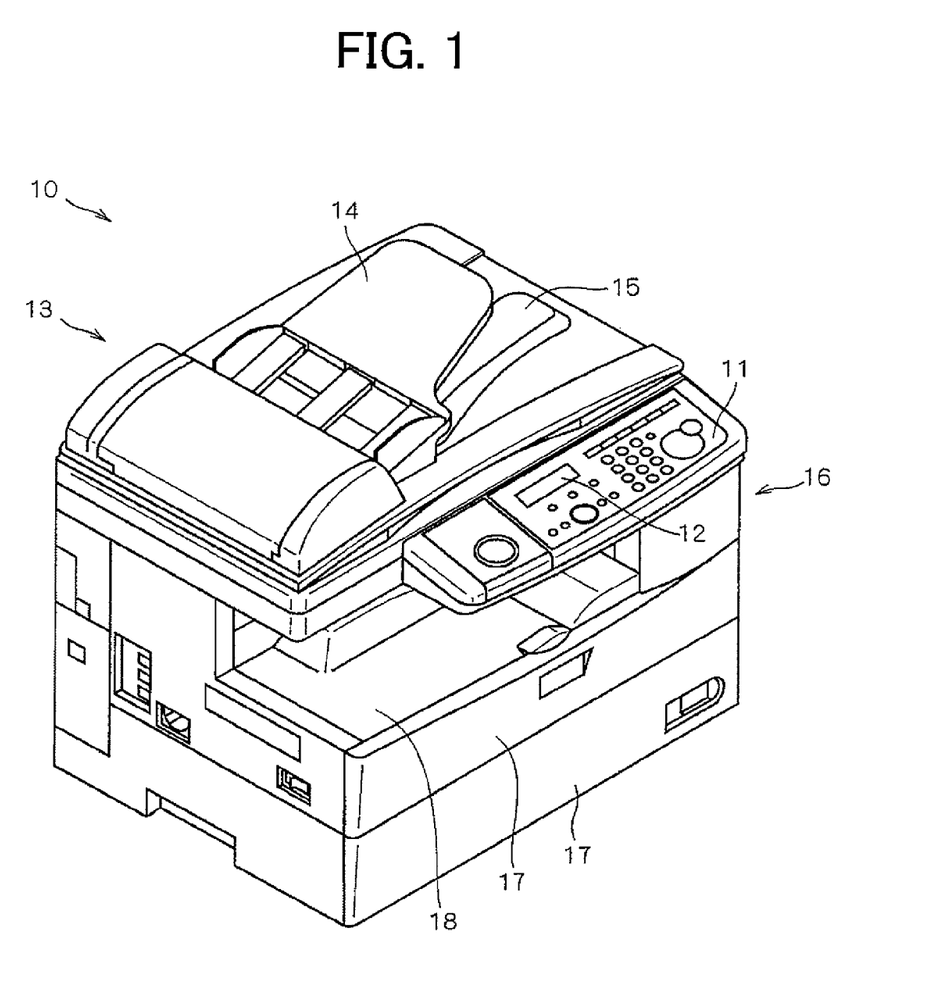
FIG. 1 is a perspective view of a copier according to the present invention.

FIG. 1 is a perspective view of a copier 10 according to the first embodiment of the present invention. The copier 10 generates image data by scanning an original document, and prints an image on a recording paper based on the image data. In the drawings, only elements and/or functions related to the present invention are illustrated. A chromaticity plane in which coordinate conversion and a masking process are performed is a CbCr color difference plane in a YCbCr calorimetric system.

An operation unit 11 includes letters, numbers, and function keys, which are mechanical switches. When the keys are operated by a user, the operation unit 11 accepts various commands such as scanning and copying or the like of the original document.

A display unit 12 is a general display including a displaying device such as a liquid crystal display (LCD) or the like, and displays various information as an image on a screen. A touch screen displayed on the display unit 12 may substitute for the keys of the operation unit 11.

A scanning unit 13 sequentially scans the original document placed on a document tray 14 including an Automatic Document Feeder (ADF), by using an image pickup device such as a charge coupled device (CCD) line sensor (not illustrated) or the like, and generates the image data based on the image recorded on the original document. The scanned original document is discharged onto a document output tray 15. The original document is not necessarily scanned by the ADF, but may be scanned by using a Flat Bed Scanner (FBS) system. The FBS executes a procedure in which the original document placed on a document glass (not illustrated) is scanned by the image pickup device, and the scanned original document is discharged.

A printing unit 16 is a printer that uses an electrophotographic method or the like. The printing unit 16 prints as a hard copy the image data generated by the scanning unit 13. To be more precise, toner supplied from a toner cartridge is adhered to a photosensitive drum based on the image data. The adhered toner is transferred on the recording paper transported from a recording paper cassette 17 by a recording-paper transportation unit, and the recording paper on which the toner is transferred is discharged onto a recording-paper output tray 18. The image data recorded by the printing unit 16 is not necessarily image data generated by the scanning unit 13, but may be image data received through a network to which the copier 10 is connected.

Figure 2:
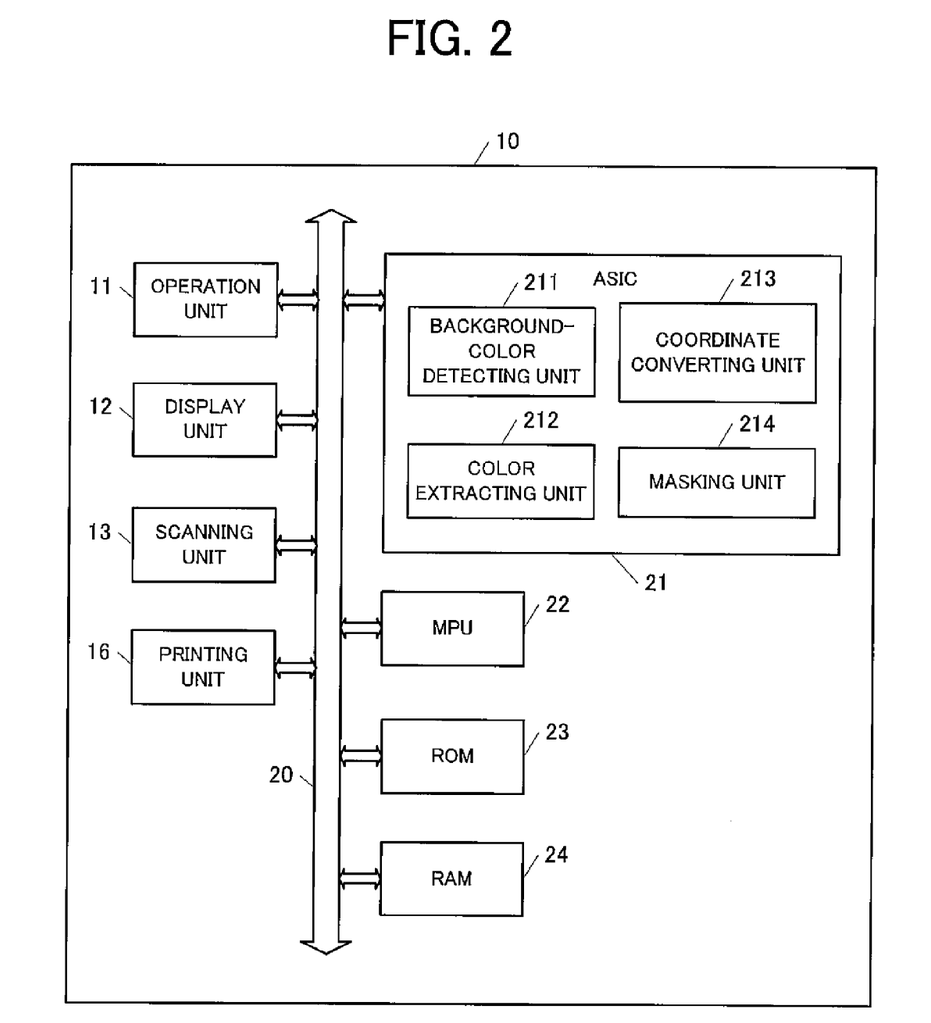
FIG. 2 is a block diagram of a copier circuit.

FIG. 2 is a block diagram of the copier 10. Each of the above-described components is electrically connected via a bus 20, and is also electrically connected with the components described below.

An ASIC 21 includes a background-color detecting unit 211, a color extracting unit 212, a coordinate converting unit 213, and a masking unit 214, of the present invention. The ASIC 21 includes an Auto Color Selector (ACS) function for determining whether the image scanned by the scanning unit 13 is color, gray or blank, and performs a prescribed process in accordance with the determination result.

In the present embodiment, an example is described in which a background color of the image is detected to be masked. However, in the present invention, an arbitrary color can be extracted to be masked. For example, by displaying a predetermined color sample on the display unit 12, and by accepting input of a color selected by the user, the selected color may be extracted. Alternatively, by displaying on the display unit 12 image data generated by prescanning the original document by the scanning unit, the color (not necessarily the background color) selected by the user by using the touch screen may be extracted to be masked. Each component included in, and the processing contents of, the ASIC 21 are described later.

A Micro Processing Unit (MPU) 22 performs control of input signals such as commands from the operation unit 11; computing of data based on the input signals; generation of output signals; the display on the display unit 12; the scanning unit 13; the printing unit 16; and the ASIC 21. A Read Only Memory (ROM) 23 stores programs executed by the MPU 22 and the data necessary for the control performed by the MPU 22. A Random Access Memory (RAM) 24 temporarily stores the data necessary for total control performed by the MPU 22. Thus, various functions of the copier 10 are accomplished. The MPU 22 controls each of the components of the copier 10, in cooperation with the ROM 23 and the RAM 24.

<Functions and processing contents of the ASIC 21>

Figure 3:
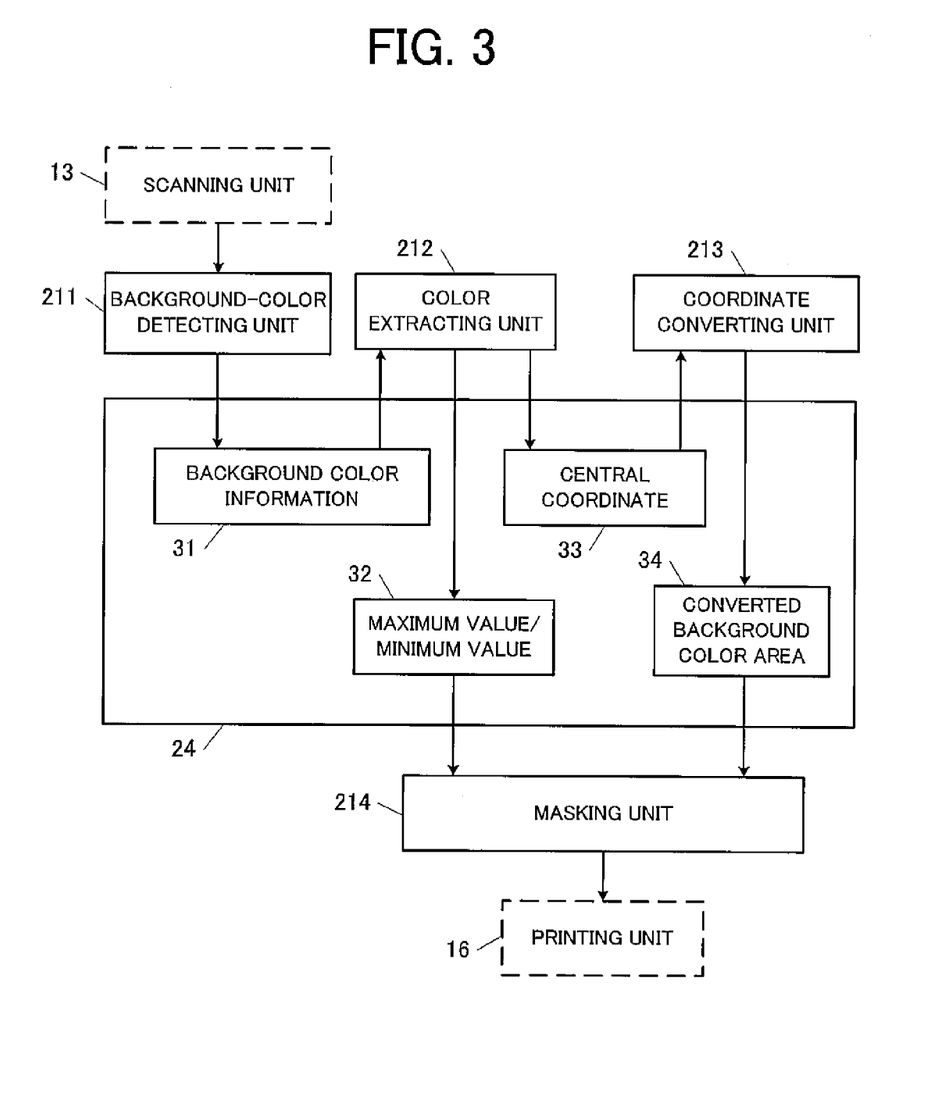
FIG. 3 is a block diagram explaining functions of an Application Specific Integrated Circuit (ASIC).

FIG. 3 is a block diagram for explaining functions of the ASIC 21. A detailed description will be made of the functions and data processing of the ASIC 21. In the ACS function of the ASIC 21, a mean reduction unit (not illustrated) obtains, for example, an average of tone values of a target pixel, a pixel disposed on the right thereof, a pixel disposed on the lower right thereof, and a pixel disposed thereunder, and substitutes the obtained value with the converted pixel. Then, a gamma correction unit (not illustrated) adjusts a variation ratio of voltage equivalents with respect to the variation of image brightness. When the original document is represented in an RGB calorimetric system, such as when the original document is scanned by a color CCD, a matrix operation unit (not illustrated) converts the RGB calorimetric system into a YCbCr calorimetric system. After executing this initial processing, the background-color detecting unit 211 detects background color information 31 of the original document scanned by the scanning unit 13.

Figure 4:
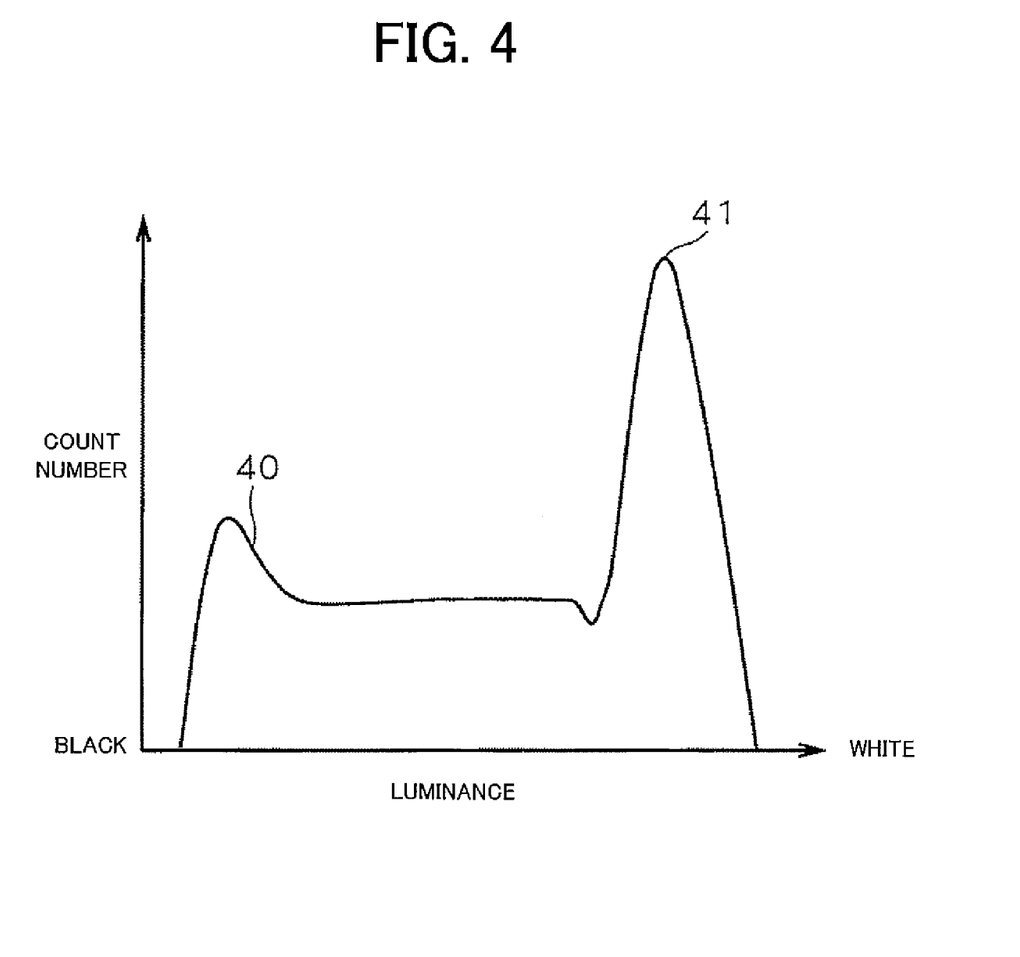
FIG. 4 is a histogram of luminance of an original document.

FIG. 4 is a histogram of luminance of the original document. The method for detecting the background color information 31, for example, extracts the luminance of the scanned original document to count the pixels, and creates a histogram 40. The method detects a white area side that exceeds a peak "P" on the white area side, as the background color information 31.

When the background color information 31 is detected, the color extracting unit 212 extracts a background color area 51 (refer to FIG. 5) that corresponds to the background color information 31. More specifically, the color extracting unit 212 extracts maximum and minimum values 32 of each coordinate axis and a central coordinate 33 derived from the maximum and minimum values 32, with respect to the background color area 51 corresponding to the background color information 31 in the CbCr color difference plane.

Figure 5:
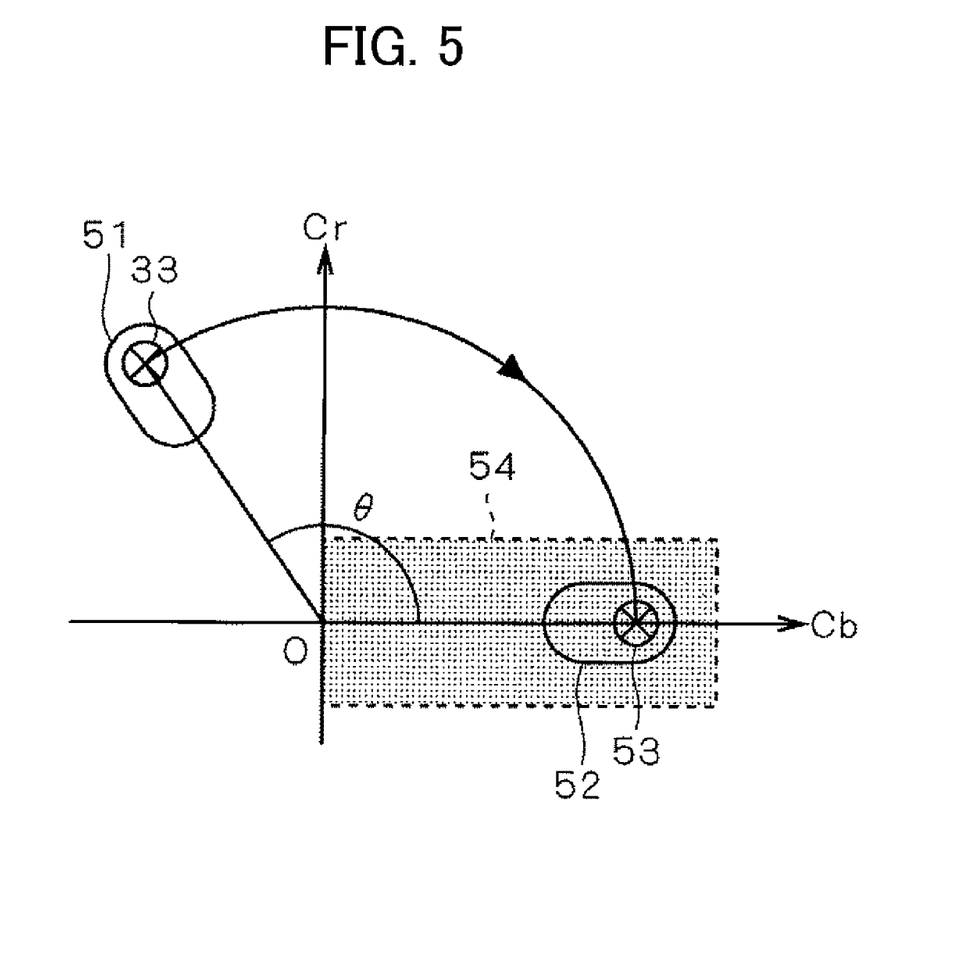
FIG. 5 is a diagram explaining a mask area in a CbCr color difference plane.

FIG. 5 illustrates a mask area in the CbCr color difference plane. When the central coordinate 33 is extracted with respect to the background color area 51 extracted by the color extracting unit 212, the coordinate converting unit 213 performs the coordinate conversion in the CbCr color difference plane to calculate a converted background color area 52.

More specifically, the coordinate converting unit 213 rotates the central coordinate 33 around the origin of the CbCr color difference plane, and moves the central coordinate 33 onto a coordinate axis (in the present embodiment, onto a "Cb" axis). To be more precise, the coordinate converting unit 213 rotates the central coordinate 33 such that an angle θ between a line extending from the central coordinate 33 to the origin of the CbCr color difference plane and the "Cb" axis will be zero. The converted background color area 52 is calculated based on the maximum and minimum values 32 of each of the coordinate axes extracted by the color extracting unit 212, the converted background color area 52 including a coordinate 53 acquired by having the central coordinate 33 moved.

When the converted background color area 52 is calculated, the masking unit 214 determines a mask area 54 in accordance with the converted background color area 52 to mask. More specifically, the masking unit 214 determines, as the mask area 54, an area including a rectangular area defined to be more than or equal to zero and less than or equal to a maximum value of the converted background color area 52 on one coordinate axis ("Cb" axis), and to be more than or equal to a minimum value and less than or equal to a maximum value of the converted background color area 52 on another coordinate axis ("Cr" axis).

<Operations of the copier 10>

Figure 6:
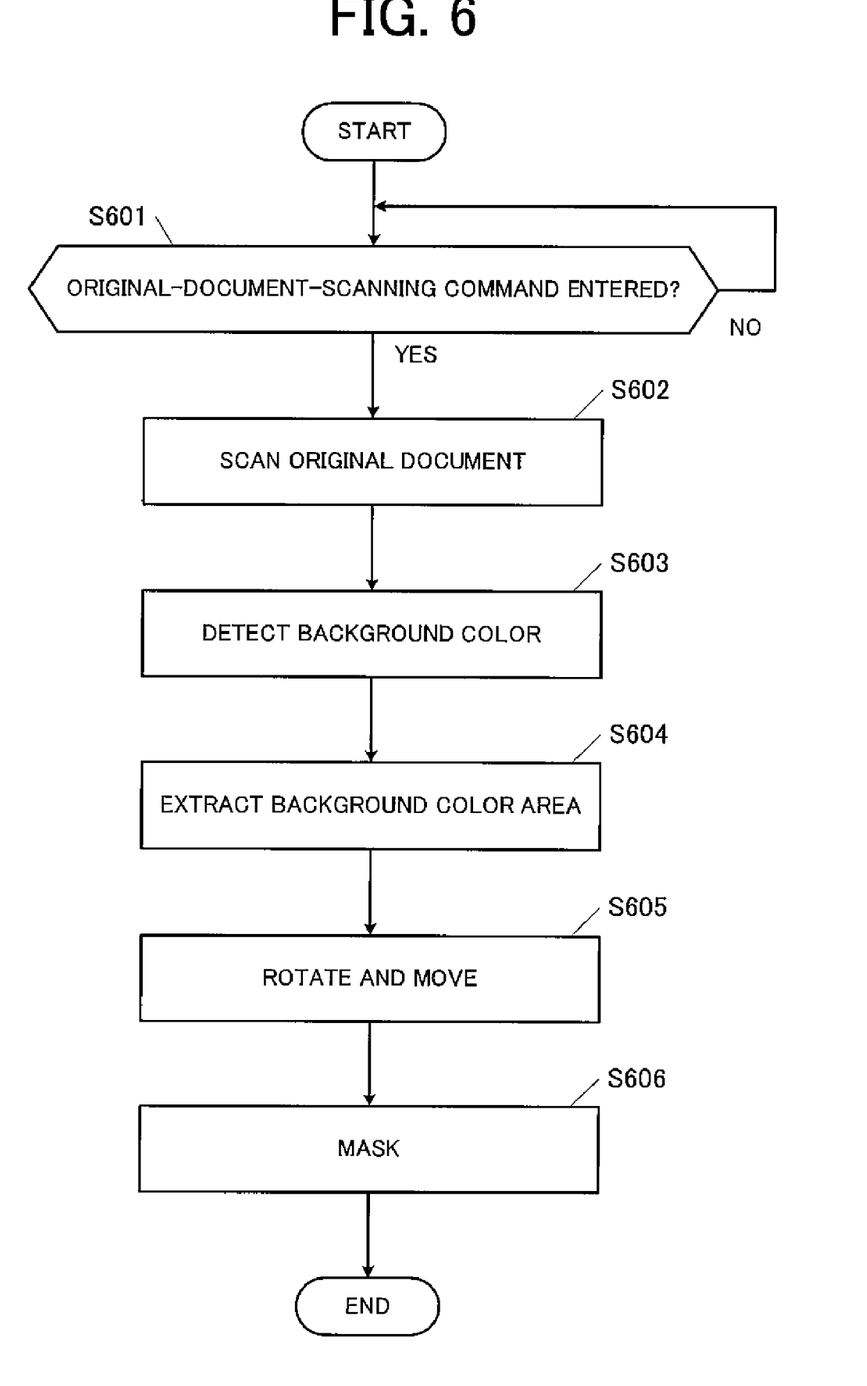
FIG. 6 is a flow chart of procedures for executing masking.

FIG. 6 is a flow chart of a masking execution procedure. By having the above-described configuration, the copier 10 performs the processes described below. In the present flow chart, only the masking processes performed by the copier 10 are represented, and illustrations and explanations of other processes are omitted. Unless otherwise specified, a series of processes by the copier 10 are performed automatically under the control of the MPU 22.

Under a state in which a power supply of the copier 10 is ON, the copier 10 waits until a command for scanning the original document placed on the document tray 14 by the user is entered (step S01). When the document-scanning command is entered, the original document placed on the document tray 14 is scanned (step S602). When the original document is scanned in step S602, the background-color detecting unit 211 detects the background color information 31 (step S603).

When the background color information 31 is detected in step S603, the color extracting unit 212 extracts the background color area 51 (step S604). The coordinate converting unit 213 moves the background color area 51 extracted in step S604 onto the positive "Cb" axis (step S605). The area with the rectangular area therein, including the converted background color area 52 rotated in step S605, is determined as the mask area 54 to be masked (step S606). By applying the set mask, printing by the printing unit 16 is performed, and other processes etc. are executed.

Thus, since the arbitrary color of the original document in the CbCr color difference plane is extracted, and the mask area is determined in accordance with the extracted color area, any color areas can be reliably masked. Since the masking is performed after performing the coordinate conversion in the color difference plane, the color area can be masked by using a simple arithmetic circuit.

Since the coordinate converting unit 213 rotates the central coordinate 33 of the color area extracted by the color extracting unit 212, around the origin "O" of the CbCr color difference plane onto the "Cb" axis, the color area is masked by simpler calculation compared with a case in which the mask area is determined without the coordinate conversion.

The masking unit 214 determines, as the mask area 54 to mask, the area including the rectangular area defined to be more than or equal to zero and less than or equal to the maximum value of the converted background color area 52 on the "Cb" axis, and to be more than or equal to the minimum value and less than or equal to the maximum value of the converted background color area 52 on the "Cr" axis. Therefore, the background color area is masked by a simpler calculation.

Since the background-color detecting unit 211 is further provided for detecting the background color of the original document, and the color extracting unit 212 extracts the background color detected by the background-color detecting unit 211, the background color area 51 is reliably masked by using the simple arithmetic circuit.

<Variations>

While embodiments of the present invention have been described, the invention is not limited to the described embodiments. For example, while an example has been described in which the original document is scanned by the scanning unit 13, the ASIC 21 may perform the image processing after the matrix operation unit converts into the YCbCr calorimetric system based on RAW data of the RGB calorimetric system, such as RAW data read from a digital camera or the like. Alternatively, the ASIC 21 may perform the image processing after an image file in a Joint Photographic Expert Group (JPEG) format is received from a personal computer (PC), etc. and is decoded to extract YCbCr.

The present invention is not limited to the copier 10, and may be a scanner, a facsimile machine, or a Multi Function Peripheral (MFP) including a combination of a copier, a scanner, and a facsimile machine. Further, the present invention is not limited to the ASIC, and may apply a circuit capable of performing the above-described processes. Furthermore, the present invention is not limited to each of the above-described processes.

While the present invention has been described with respect to embodiments thereof, it will be apparent to those skilled in the art that the invention may be modified in numerous ways and may assume many embodiments other than those specifically set out and described above. Accordingly, the appended claims cover all modifications that fall within the true spirit and scope of the present invention.

What is claimed is:

1. An image processing device comprising:
    a scanning unit that scans an original document;
    a color extracting unit that extracts an arbitrary color area in a chromaticity plane with respect to the original document scanned by the scanning unit;
    a coordinate converting unit that performs coordinate conversion in the chromaticity plane, on the color area extracted by the color extracting unit; and
    a masking unit that determines a mask area to mask, in accordance with a converted color area on which the coordinate converting unit performed the coordinate conversion.

2. The image processing device according to claim 1, wherein the coordinate converting unit rotates the color area extracted by the color extracting unit, around the origin of the chromaticity plane onto one coordinate axis.

3. The image processing device according to claim 2, further comprising a central-coordinate extracting unit that extracts a central coordinate of the color area extracted by the color extracting unit, wherein the coordinate converting unit rotates the extracted central coordinate such that the central coordinate will be positioned on the one coordinate axis.

4. The image processing device according to claim 2, wherein the masking unit determines, as a mask area to mask, an area including a rectangular area defined to be more than or equal to zero and less than or equal to a maximum value of the converted color area on one coordinate axis, and to be more than or equal to a minimum value and less than or equal to a maximum value of the converted color area on another coordinate axis.

5. The image processing device according to claim 1, further comprising a background-color detecting unit that detects a background color of the original document scanned by the scanning unit,
wherein the color extracting unit extracts the color area of the background color detected by the background-color detecting unit.

6. The image processing device according to claim 5, wherein the background-color detecting unit determines the chromaticity plane on which the background color is extracted, based on luminance of a scanned image.

7. The image processing device according to claim 6, wherein the chromaticity plane is a CbCr color difference plane.

8. An image processing device comprising:
means for scanning an original document;
means for extracting an arbitrary color area in a chromaticity plane with respect to the scanned original document;
means for performing coordinate conversion in the chromaticity plane on the extracted color area; and
means for determining a mask area to mask, in accordance with the converted color area on which the coordinate conversion has been performed.

9. The image processing device according to claim 8, further comprising means for extracting a central coordinate of the extracted color area.

10. The image processing device according to claim 9 further comprising means for rotating the central coordinate of the extracted color area, around the origin of the chromaticity plane, to move onto one coordinate axis.

11. The image processing device according to claim 10, further comprising means for determining, as a mask area, an area including a rectangular area defined to be more than or equal to zero and less than or equal to a maximum value of the converted color area on one coordinate axis, and to be more than or equal to a minimum value and less than or equal to a maximum value of the converted color area on another coordinate axis.

12. The image processing device according to claim 8, further comprising:
means for detecting a background color of the scanned original document; and
means for extracting the color area of the detected background color.

13. The image processing device according to claim 12, further comprising means for determining the chromaticity plane on which the background color is to be extracted, based on luminance of a scanned image.

14. The image processing device according to claim 13, wherein the chromaticity plane is a CbCr color difference plane.

15. An image processing method comprising the steps of:
scanning an original document;
extracting an arbitrary color area in a chromaticity plane with respect to the scanned original document;
performing coordinate conversion in the chromaticity plane on the extracted color area; and
determining a mask area to mask, in accordance with the converted color area on which the coordinate conversion has been performed.

16. The image processing method according to claim 15, further comprising the step of extracting a central coordinate of the extracted color area.

17. The image processing method according to claim 16, further comprising the step of rotating the central coordinate of the extracted color area around the origin of the chromaticity plane to move onto one coordinate axis.

18. The image processing method according to claim 15, wherein an area including a rectangular area defined to be more than or equal to zero and less than or equal to a maximum value of the converted color area on one coordinate axis, and to be more than or equal to a minimum value and less than or equal to a maximum value of the converted color area on another coordinate axis, is determined as a mask area.

19. The image processing method according to claim 15, further comprising the step of determining the chromaticity plane on which the background color is to be extracted, based on luminance of a scanned image.

20. The image processing method according to claim 19, wherein the chromaticity plane is a CbCr color difference plane.

* * * * *